United States Patent
Spittle et al.

(10) Patent No.: US 7,752,804 B2
(45) Date of Patent: Jul. 13, 2010

(54) POROUS AND NON-POROUS PARTICLE REINFORCEMENT FOR VISCOUS HYDRAULIC MATRICES

(75) Inventors: Kevin S. Spittle, Vero Beach, FL (US); Marc S. Theisen, Signal Mountain, TN (US); James D. Tanner, Northbrook, IL (US)

(73) Assignee: Profile Products L.L.C., Buffalo Grove, IL (US)

( * ) Notice: Subject to any disclaimer, the term of this patent is extended or adjusted under 35 U.S.C. 154(b) by 317 days.

(21) Appl. No.: 12/036,417

(22) Filed: Feb. 25, 2008

(65) Prior Publication Data

US 2008/0202024 A1 Aug. 28, 2008

Related U.S. Application Data

(60) Provisional application No. 60/891,570, filed on Feb. 26, 2007.

(51) Int. Cl.
*A01G 7/00* (2006.01)
(52) U.S. Cl. .......................................................... 47/9
(58) Field of Classification Search .................... 47/9
See application file for complete search history.

(56) References Cited

U.S. PATENT DOCUMENTS

| | | | |
|---|---|---|---|
| 3,091,436 A * | 5/1963 | Finn | 366/131 |
| 4,297,810 A | 11/1981 | Hansford | |
| 5,082,500 A * | 1/1992 | Nachtman et al. | 106/162.5 |
| 5,567,087 A | 10/1996 | Theisen | |
| 5,616,399 A | 4/1997 | Theisen | |
| 5,741,832 A | 4/1998 | Spittle | |
| 5,779,782 A | 7/1998 | Spittle | |
| 5,942,029 A | 8/1999 | Spittle | |
| 6,076,299 A | 6/2000 | Spittle et al. | |
| 6,158,167 A | 12/2000 | Spittle | |
| 6,349,499 B1 | 2/2002 | Spittle | |
| 6,358,312 B1 * | 3/2002 | Tanner et al. | 106/416 |
| 6,360,478 B1 | 3/2002 | Spittle | |
| 6,729,807 B1 | 5/2004 | Spittle | |
| 2002/0009622 A1 * | 1/2002 | Goodson | 428/703 |
| 2008/0163658 A1 * | 7/2008 | Spittle | 71/6 |
| 2008/0202024 A1 * | 8/2008 | Spittle et al. | 47/9 |
| 2009/0265980 A1 * | 10/2009 | Spittle et al. | 47/9 |

FOREIGN PATENT DOCUMENTS

JP 05123063 A * 5/1993 ........................ 47/9

* cited by examiner

*Primary Examiner*—Francis T Palo
(74) *Attorney, Agent, or Firm*—Brooks Kushman P.C.

(57) ABSTRACT

A hydraulically-applied mulch matrix comprising non-porous particles, porous particles and mixtures thereof combined with a mechanically and or chemically bonded fiber mulch mixed within a high viscosity slurry to keep the particles in suspension for dispersion onto soil surfaces with mulch spraying equipment for enhanced erosion control and higher level plant establishment.

24 Claims, No Drawings

POROUS AND NON-POROUS PARTICLE REINFORCEMENT FOR VISCOUS HYDRAULIC MATRICES

BACKGROUND OF THE INVENTION

1. Field of the Invention

The invention relates to highly viscous hydraulically-applied mulch media containing porous particles to enhance erosion control and vegetation establishment performance of the mulch matrix for application to soil and soil-like surfaces.

2. Background Art

The purpose of mulches is to increase seed germination and decrease soil erosion to allow seedlings to become firmly established in the soil. Mulches typically consist of natural materials such as straw, hay, wood, paper or compost. The mulches are generally mixed with water and placed in a holding tank where they are mixed and then sprayed onto the desired soil surface. Reference is made to the sprayable mulch of Hansford, U.S. Pat. No. 4,297,810 entitled "sprayable hydromulch", which is comprised of hay, magazine paper stock, a binder and a coloring agent.

These chemically bonded natural fiber hydraulically-applied mulches may rely upon soil chemistry or positive-negative attraction modes to secure the soil surface for short term erosion control. Mechanically and/or chemically bonded fiber matrices rely upon physical, fiber to fiber and/or chemical bonding for erosion control performance. Although the mulches may be sufficiently well bonded, erosion control and plant establishment performance has been limited for a number of reasons. In some instances the chemically-bonded mulch forms an almost impenetrable layer over the soil surface that limits water and oxygen needed for plant growth. Additionally, the mulch layer itself can be difficult to penetrate by germinated seedlings. Mulch matrices which lack mechanically interlocking fibers have difficulty absorbing raindrop splash energy, are susceptible to sheet erosion and cannot withstand prolonged concentrated flow energy.

Crimped natural fibers or man-made fibers comprised of polyester, polypropylene, cellulose, and other natural and man-made polymers have been linked to form a matrix, which allows penetration by germinated seedlings and allow air, water and light to reach to the soil surface. However, these synthetic fibers are not readily biodegradable and the natural fibers, though biodegradable, do not retain the matrix formation required to handle high rates of concentrated flow energy associated with rilling erosion. Rill erosion is the removal of soil by concentrated water running through streamlets. This level of erosive energy is commonly associated with long slope length or areas of overland flow.

SUMMARY OF THE INVENTION

The present invention provides a composition for viscous hydraulic mulch matrices featuring porous or non-porous particles mixed with a mechanically and or chemically bonded fiber mulches in a highly viscous slurry. The porous particles contain internal channels and spaces which increase the flow of water and oxygen through the mulch matrix and prevent loss of water by retaining moisture longer in the micro-pore interstitial spaces. It is further the object of this invention to provide methods of preparation of the sprayable mulch matrix within a hydraulic seeding machine or by combining the porous ceramic particles during the production of the mulch medium or the chemical binder that is combined with the mulch. The mechanically and or chemically bonded fiber mulch is mixed with a sufficient amount of porous particles. A preferred embodiment utilizes a porous ceramic particle. However particles comprised of perlite, vermiculite, zeolite, Fuller's earth, diatomatious earth, clay and/or crushed aggregates or mixtures thereof, may also be utilized.

DETAILED DESCRIPTION OF THE PREFERRED EMBODIMENT(S)

The invention thus features particle reinforced sprayable mulch for application to soil surfaces in a number of commercial markets, including gardening, grounds maintenance, landscaping, highway roadside construction and maintenance, landfills, mining, slope stabilization, turf reinforcement systems, roof greening, and agriculture, to name a few. In addition the mulch product may also contain natural binders, traditional organic and inorganic mulch fibers, soil amendments including fertilizers, compost, herbicides, and pesticides, and when appropriate, seeds, stolons and other forms of live plant materials.

The mulch fibers composition may comprise 75-98% by weight of mulch. The ratio of mulch fibers to chemical binder is 7 to 30:1 or preferably 10:1 in the final composition. Water is added to the mixture to form the hydraulic slurry prior to introducing the porous ceramic particles. The mulch, comprised of crimped fibers, non-crimped fibers, or a mixture thereof, is used to prepare a mechanically and or chemically bonded fiber mulch matrix. The fibers may be man-made fibers, or naturally occurring fibers, for example. Natural fibers are preferred and may include wood, straw, coir and jute fibers, cotton, flax, paper, compost or a mixture thereof. The mechanically bonded mulch fibers are described in Spittle, U.S. Pat. Nos. 5,741,832; 5,779,782; 5,942,029; 6,349,499; and 6,360,478, which are incorporated herein by reference.

The average fiber length should be at least ⅛ inch (3.175 mm), and preferably at least 3/16 inch (4.762 mm). Selection of fibers for manufacturing may be enhanced by a rotap classifier utilizing, 8, 16, 24, 50 and 100 mesh sieves retaining a minium of 30% or more of the screened fibers on the 8, 16 & 24 combined sieve collection. The fibers selected should be treated, preferably with a polymer-based water absorbent, added to the fiber mulch to establish the high viscosity required to suspend the porous ceramic particles within the matrix. Suspending polymer agents such as guar gum, pectin, gelatin, carrageenan, psyllium, chitosan, bean mills, polyacrylamides and/or sodium polyacrylate at a quantity required to preferably achieve a minimum slurry viscosity of 1,000,000 centipoises, when evaluated by a SST2000 Rheometer with vane V4-20 at 22 degrees C. Additional methods of fiber selection are presented in Spittle, U.S. Pat. Nos. 6,076,299 and 6,158,167, which are incorporated by reference herein.

In order to facilitate suspension of the mulch and porous particles for spraying purposes, the mulch matrix and porous ceramic particles may be suspended in a highly viscous slurry with a consistency of pudding. The high viscosity slurry may be comprised of fibers with a crosslinked or non-crosslinked hydrocolloid binder. Although a crosslinked hydrocolloid binder such as an agar, carrageenan, gelatin, pectin or guar gum is the preferred slurry ingredient, other slurry ingredients such as polyacrylamide, sodium polyacrylate, psyllium, chitosans, starches, bean mills and mixtures thereof may be used as suspending agents and binders. Additional suspending agents are well known to those skilled in the art, and include, without limitation, associative thickeners, water soluble polymers of numerous types, naturally occurring saccharide-based polymers such as starches and soluble lignocellulosic digestion products, and proteins. Chemically derivatized celluloses are also useful, examples being methyl cellulose, propyl cellulose, hydroxymethyl cellulose, hydroxypropyl cellulose, carboxymethyl cellulose and the like.

Associative thickeners are molecules of moderate to low molecular weight, generally below 25,000 Da and more preferably lower than 20,000 Da which, in an aqueous environment, associate through overlap of hydrophobic and hydrophilic segments, creating massive associated species in solution. Examples of such associative thickeners are polymers with a polyoxyethylene internal hydrophile and external hydrophobes. Such associative thickeners can be prepared, for example, by oxyethylating ethylene glycol to a desired molecular weight, followed by oxyalkylating with a long chain a-olefin oxide. The long chain alkyl group preferably has from 8 to 30 carbon atoms. The associative thickeners with longer chain alkyl groups are particularly shear sensitive, so their dispersions can be easily pumped and sprayed, yet reversibly increase viscosity dramatically upon storing. The amounts of such suspending agents can be preferably less than 15%, but in any case sufficient to achieve the desired viscosity. Amounts as little as 1-2% are effective. Associative thickeners of higher biodegradability can be fabricated by utilizing "natural" hydrophiles and hydrophobes, for example hydrolyzed celluloses or polysaccharides, and polylactic acid, polyglycolic acid, and poly(lactic/glycolic) acid copolymers.

The particles may be added to the fiber mulch during manufacture or prior to dispensing of the fiber and slurry composition from mulch spraying equipment. Likewise, the addition of soil amendments such as fertilizer, compost, herbicides, pesticides and when appropriate, seeds, stolons and other forms of live plant material may be added during the fiber mulch preparation or prior to dispensing of the fiber and slurry composition from mulch spraying equipment. The combination of porous ceramic particles with the mechanically and/or chemically modified fiber mulch matrix facilitates use of natural fibers to create a highly effective resultant mulch product. These enhanced formulations retain the matrix properties to preserve vertical movement of water and oxygen while increasing the density of the fiber matrix allowing for higher rates of kinetic energy (force) absorption of large diameter raindrops falling at terminal velocity from intense storms and resulting overland flow (shear stress) over long slope surfaces or in areas of concentrated flow such as drainage ditches, channels and shorelines.

The enhanced fiber mulch formulations may be used in combination with non-degradable turf reinforcement mats and other geosynthetic or structural systems used to reinforce natural vegetation. When fully vegetated, these systems are capable of doubling the erosion resistance of natural vegetation versus un-reinforced vegetation. The enhanced fiber mulch formulations may be applied below, within or above the geosynthetic component resulting in increased short-term erosion protection (prior to and during growth establishment) and accelerated growth establishment and density of the vegetation for permanent long-term protection. Turf reinforcement mats disclosed in Spittle, U.S. Pat. No. 6,729,807, and Theisen, U.S. Pat. Nos. 5,616,399 and 5,567,087, are incorporated by reference herein.

The preferred porous particle is a porous ceramic particle which is clay-based and marketed by Profile Products, LLC of Buffalo Grove, Ill. These porous ceramic particles are an inorganic soil treatment developed to preserve water and oxygen flow to plant root systems in easily compacted soils. The porous ceramic particles should be of sufficiently small size to facilitate combination and use in a viscous hydraulic mulch matrix. In development of the sprayable hydraulic mulch product the smaller the porous particle size, the better retention of moisture and distribution throughout the fiber mulch matrix.

The final concentration should provide from one million particles to 50 million particles per pound (2.2 million particles to 110 million particles per kilogram). The final concentration may be determined by the desired moisture retention and erosion control performance required for the target soil surface, slope gradient, slope length, annual rainfall rate and the anticipated storm intensity run off conditions.

While porous ceramic particles are the preferred slurry ingredient to increase the density and pore space of the fiber matrix, the incorporation of other particles such as perlite, vermiculite, zeolite, Fuller's earth, diatomatious earth, clay or mixtures and/or crushed aggregates thereof, will facilitate a comparable performance response relative to enhancing erosion control and vegetative establishment of the hydraulically-applied mulch matrix. Numerous smectite clays are also feasible for use in forming porous particles. Those containing significant quantities of montmorillinite and opal CT (cristobalite, tridymite) are preferred. Other particularly suitable clays are the smectite clays such as bentonite, montmorillinite (preferred), beidellite, nontronite, hectorite, saponite, attapulgite, sepiolite and mixtures thereof. Suitable porous calcined smectite clay soil amendments are disclosed in Tanner, et al, U.S. Pat. No. 6,358,312 entitled "Sports Field Soil Conditioner," incorporated herein by reference.

The introduction of the porous ceramic particles within the hydraulic fiber mulch requires a highly viscous slurry, whose viscosity is dependent upon the physical properties of the particles, for example their size, density, and morphology. The viscosity is adjusted so as to be able to maintain the particles in suspension such that a uniform mixture can be sprayed. This viscosity is preferably a minimum of 1,000,000 centipoises when evaluated by an SST2000 Rheometer with vane V4-20 at 22 degrees C. which facilitates the retention of the particles within a viscous hydraulic mulch matrix when applied with standard mulch spraying equipment. However, in some cases, the viscosity may be lower, for example 500,000 cps or 300,000 cps. In the quiescent state (no or very low shear), the viscosity may reach very high values. However, the viscosity under shear should be low enough that the composition remains sprayable.

The incorporation of a high density particle such as sand with little or no pore space contribution will also enhance the erosion control performance of the applied hydraulic slurry by increasing the density of the installed fiber matrix, allowing for this matrix to absorb the rain drop energy more efficiently than if the particles weren't included within the matrix.

The final composition of porous particles, the mulch matrix and the high viscosity slurry should enable the sprayable mulch to be dispersed at a concentration range of approximately 15-98 kg/100 m$^2$. The density of the matrix has direct relationship to erosion control performance, wherein the higher the density or weight per unit area, the greater the raindrop splash and erosive water energy dissipation.

The ratio of mulch solids, i.e. natural and synthetic fibers to inorganic particles is preferably in the range of 1:10 to 10:1, more preferably 1:5 to 5:1, yet more preferably 1:3 to 3:1, still more preferably 1:2 to 2:1, and most preferably about 1:1.

In order to determine the amount of erosion control provided by the embodiments of the invention, use of the enhanced fiber mulch formulations were tested with and without porous ceramic reinforcement. Improvements in slope length stabilization, shear stress testing, wet tensile strength and water retention. Two studies, slope and shear stress testing were performed at Utah State Water Research Laboratory, utilizing their rainfall simulator and channel testing flume. Rainfall testing utilizing;
1. 4 feet plot width
2. 19.5 feet plot slope width
3. 2.5:1 (horizontal:vertical) plot slope
4. Sandy loam soil type
5. 5.0 and 7.15 inches per hour rainfall intensity
6. 1 hour testing duration
7. Shear stress testing The Slope Length Benefit was calculated for the fiber mulch formulation, with a reinforcement particles, was found to have a cover management factor at 7.15 inches per hour of 0.0049. The cover management factor for the fiber mulch formulation without reinforcement particles at 5" per hour, was 0.0004. Providing evidence that the fiber mulch formulation in combination with reinforcement particles improves cover management by at least 85%. In addition, slope length stabilization was calculated using Rusle, and the fiber mulch formulation in combination with porous ceramic particle reinforcement can increase the slope length stabilization by a factor of 1.85. For example, if an FGM matrice can stabilize a 100 ft. long slope, then an FGM matrice reinforced with porous ceramic particles can extend the slope length protection to 185 ft. without the need of an energy interrupter device.

Shear testing, wet tensile strength and water retention were also performed on the fiber mulch formulation. The Bonded Fiber Matrix (BFM) mulch formulation, reinforced with porous ceramic particles infilled within a Turf Reinforcement Matrix (TRM) was found to have shear capability of 2.5 lbs/sq ft. (test 1) and 106.9% improvement versus a BFM and TRM that had not been reinforced with porous ceramic particles. A wet tensile strength under 4"×5" of water averaged 1.96 lbs was calculated for the BFM with reinforcement particles formulation, which was a 98% improvement over the test material without reinforcing particles for the BFM. Water retention was calculated as 69.35 grams for the cured Flexible Growth Medium (FGM) matrix with reinforcement particles for a 26.225 square inch area, an improvement of 10.5% versus an unreinforced FGM matrix.

The mulch applied in this test contained a 1:1 ratio of fiber mulch to ceramic particles, and was spray applied at a rate of 7000 lbs/acre. The amount applied can be considerably less, depending upon the particular application, topography, etc., for example 2000 lbs/acre, and can also be more, for example 10,000 lbs/acre.

While an embodiment of the invention has been described, it is not intended that the embodiment describes all possible forms of the invention. Rather, the words used in the specification are words of description rather than limitation, and it is understood that various changes may be made without departing from the spirit and scope of the invention.

What is claimed is:
1. A highly viscous hydraulically-applied mulch having a viscosity at low shear of about 300,000 cps or more, comprising:
   a) at least one particulate component comprising porous inorganic ceramic particles;
   b) at least one fiber;
   c) at least one suspending agent; and
   d) water.
2. The highly viscous hydraulically-applied mulch of claim 1 wherein the porous inorganic particle is derived from smectite clay, perlite, vermiculite, zeolite, Fuller's earth, diatomatious earth, a clay and mixtures thereof.
3. The highly viscous hydraulically-applied mulch of claim 2, wherein at least one smectite clay is selected from the group consisting of bentonite, beidellite, nontronite, hectorite, saponite, attapulgite and sepiolite.
4. The highly viscous hydraulically-applied mulch of claim 2, wherein the smectite clay comprises montmorillinite.
5. The highly viscous hydraulically-applied mulch of claim 1, wherein the fibers comprise natural fibers and synthetic fibers.
6. The highly viscous hydraulically-applied mulch of claim 5, wherein at least one natural fiber is derived from wood, straw, cotton, flax, paper, coir, jute, compost, and mixtures thereof.
7. The highly viscous hydraulically-applied mulch of claim 5, wherein the synthetic fibers comprise polyester fiber, polypropylene fiber or mixtures thereof.
8. The highly viscous hydraulically-applied mulch of claim 5, wherein the fibers comprise mechanically bonded fibers, chemically bonded fibers or mixtures thereof.
9. The highly viscous hydraulically-applied mulch of claim 1, wherein the fibers comprise crimped fibers, non-crimped fiber, or mixtures thereof.
10. The highly viscous hydraulically-applied mulch of claim 1, wherein the at least one suspending agent comprises a crosslinked hydrocolloid binder, a non-crosslinked hydrocolloid binder, or mixture thereof.
11. The highly viscous hydraulically-applied mulch of claim 10, wherein the hydrocolloid binder comprises agar, carrageenan, gelatin, pectin, or guar gum.
12. The highly viscous hydraulically-applied mulch of claim 10, wherein the at least one suspending agent comprises a polyoxyethylene polyether, a polyacrylamide, a sodium polyacrylate, psyllium, chitosan, starch, bean mills or a mixture thereof.
13. The highly viscous hydraulically-applied mulch of claim 1, wherein the suspending agent is present in an amount of less than 15% by weight based on the total solids of the mulch.
14. The highly viscous hydraulically-applied mulch of claim 1, wherein the ratio of fibers to chemical binder is 7 to 30:1 by weight.
15. The highly viscous hydraulically-applied mulch of claim 1, further comprising as a soil amendment, fertilizer, compost, herbicide, pesticide, seed, stolon, live plant material or a mixture thereof.
16. The highly viscous mulch of claim 1, having a viscosity of about 500,000 cps or more.
17. The highly viscous mulch of claim 1, having a viscosity of about 1,000,000 cps or more.
18. The highly viscous mulch of claim 1, comprising
   as a first component a mulch containing minimally 50 weight percent natural fibers, based on solids of the first component, and
   a second component comprising inorganic particles, the weight ratio of the first component to the second component being in the range of 1:10 to 10:1.
19. The highly viscous mulch of claim 1, comprising
   as a first component a mulch containing minimally 50 weight percent natural fibers, based on solids of the first component, and
   a second component comprising inorganic particles, the weight ratio of the first component to the second component being in the range of 1:3 to 3:1.
20. The highly viscous hydraulically-applied mulch of claim 1 further comprising non-porous inorganic particles.

21. A method for stabilizing a soil surface, comprising applying a highly viscous hydraulically-applied mulch of claim 1 to the soil surface.

22. The method of claim 21, wherein preparation of a sprayable mulch matrix comprises mixing in a hydraulic seeding machine and applying to the soil surface.

23. The method of claim 22, wherein preparation of a sprayable mulch matrix comprises combining the fibers, the porous inorganic particles and the suspending agent are combined with water and the soil amendments within the hydraulic seeding machine.

24. The method of claim 11, further comprising applying a turf reinforcement mat to the soil along with said highly viscous hydraulically-applied mulch.

* * * * *